D. W. C. FARRINGTON.
Heating Stove.
No. 25,931.          Patented Oct. 25, 1859.
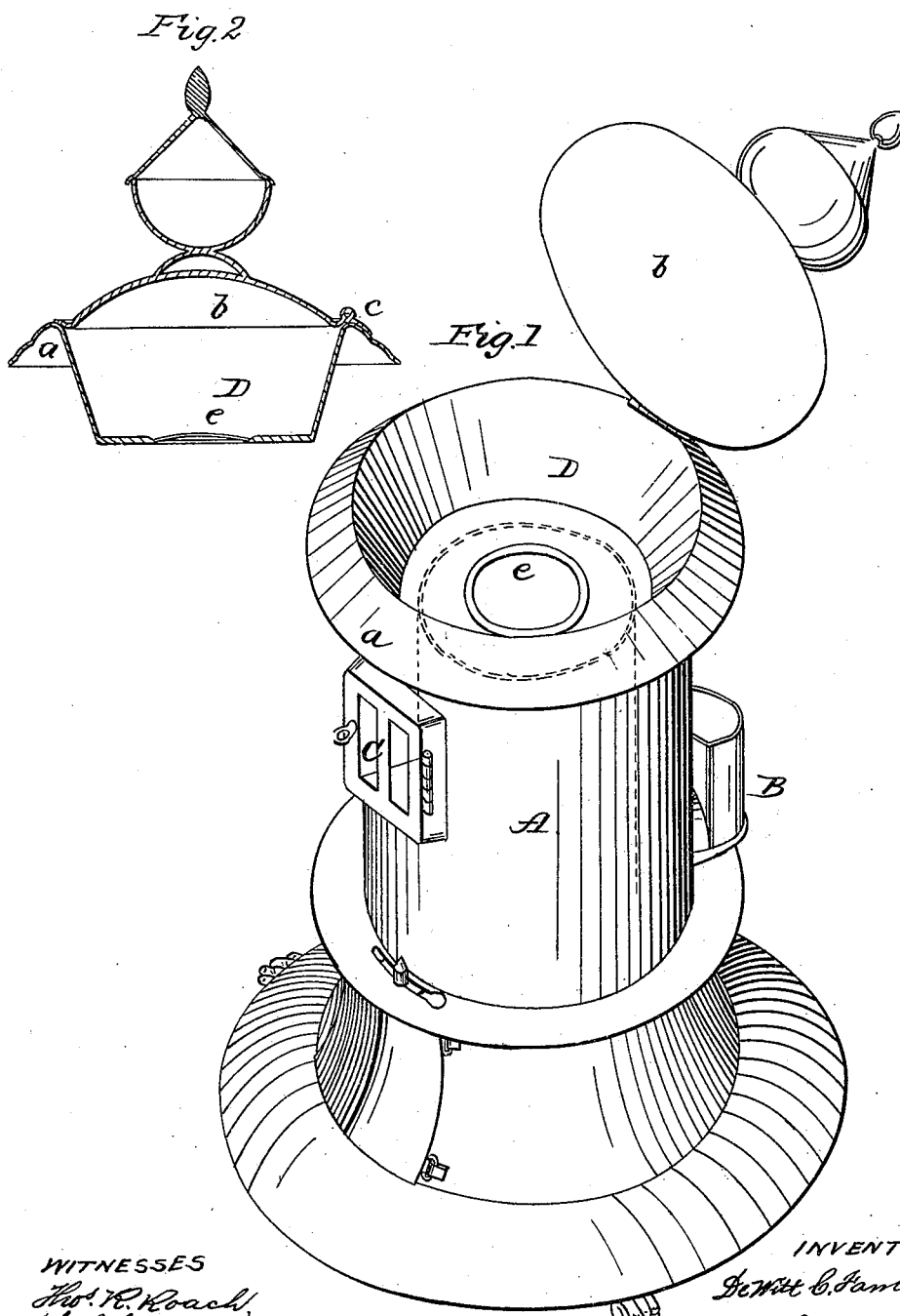

UNITED STATES PATENT OFFICE.

D. W. C. FARRINGTON, OF LOWELL, MASSACHUSETTS, ASSIGNOR TO TUTTLE & MUDGE, OF BOSTON, MASSACHUSETTS.

STOVE.

Specification of Letters Patent No. 25,931, dated October 25, 1859.

*To all whom it may concern:*

Be it known that I, D. W. C. FARRINGTON, of Lowell, in the county of Middlesex and State of Massachusetts, have invented certain new and useful Improvements in Parlor-Stoves, of which the following is a full, clear, and exact description, reference being had to the accompanying drawings, making part of this specification, in which—

Figure 1 is a view of a parlor stove with my improvements attached. Fig. 2, a section through the top and oven.

My present invention relates to that class of stoves known as parlor stoves (in distinction from cooking stoves) in which provision is made for baking; and consists in placing the oven at the top of the stove, and covering it with a top, either hinged to the stove or that may be lifted off, which when opened will give access to the oven: whereby I attain the required facilities for baking, without marring the external appearance of the stove, with oven doors.

That others skilled in the art may understand and use my invention, I will proceed to describe the manner in which I have carried it out.

In the said drawings A is the body of the stove C the fire door B the smoke pipe. The top $a$ has attached to it the oven D (shown in section Fig. 2) which sinks down into the body of the stove; the lid $b$ which also forms the ornamental top of the stove is hinged at $c$, and is represented in Fig. 1 opened to give access to the oven. If preferred the hinge may be omitted, and the lid be entirely removable. The oven door D has a hole in the bottom of it, in which to place a kettle for boiling water. The hole is covered with a lid $e$.

It will be seen that with the above arrangement of oven, I obtain a neat parlor stove, which so far as external appearances are concerned is the same as if used only for heating purposes, as it is not disfigured by a door on the side to give access to the oven, but which may be used for baking or boiling a kettle when required.

The lid $b$ is here represented solid; it may however be of openwork to allow the heat to pass off more readily when the oven is not in use, and be partially or entirely closed when baking, by a revolving plate which covers the open work (like a register), and a tin reflector may be placed on the inside of the lid, to reflect the heat from the sides of the oven, down onto the top of the bread. As the bread would sometimes be burned if placed directly on the bottom of the oven D, I place it on a small grid-iron, which raises the bread an inch or two from the bottom of the oven. These details, as well as the shape of the stove and oven may be varied without departing from the spirit of my invention.

I do not claim a stove having an oven, to which access is had through a door in the side of the stove, but

What I claim as my invention and desire to secure by Letters Patent, is—

A parlor stove having an oven which is opened by raising the top, in the manner substantially as herein set forth.

DE WITT C. FARRINGTON.

Witnesses:
   SAML. T. WRIGHT,
   GEO. G. FARRINGTON.